(12) United States Patent
Kusaka

(10) Patent No.: US 10,380,176 B2
(45) Date of Patent: Aug. 13, 2019

(54) INFORMATION DISPLAY DEVICE FOR VEHICLE

(75) Inventor: Kousuke Kusaka, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 1045 days.

(21) Appl. No.: 14/122,160

(22) PCT Filed: Jul. 4, 2012

(86) PCT No.: PCT/JP2012/067086
§ 371 (c)(1),
(2), (4) Date: Nov. 25, 2013

(87) PCT Pub. No.: WO2013/008695
PCT Pub. Date: Jan. 17, 2013

(65) Prior Publication Data
US 2014/0107821 A1    Apr. 17, 2014

(30) Foreign Application Priority Data

Jul. 8, 2011    (JP) .................................. 2011-151595

(51) Int. Cl.
| G06F 17/00 | (2019.01) |
| G06F 16/60 | (2019.01) |
| B60K 35/00 | (2006.01) |
| G06F 3/0485 | (2013.01) |
| G06F 3/0354 | (2013.01) |

(52) U.S. Cl.
CPC ............. *G06F 16/60* (2019.01); *B60K 35/00* (2013.01); *G06F 3/03547* (2013.01); *G06F 3/0485* (2013.01); *B60K 2350/1004* (2013.01); *B60K 2350/1056* (2013.01); *B60K 2350/1096* (2013.01); *B60K 2350/2052* (2013.01); *B60K 2350/901* (2013.01); *B60K 2350/928* (2013.01)

(58) Field of Classification Search
USPC .......................................... 700/94; 715/716
See application file for complete search history.

(56) References Cited

U.S. PATENT DOCUMENTS

| 8,151,210 B2 * | 4/2012 | Nezu et al. .................... 715/804 |
| 8,577,549 B2 * | 11/2013 | Schofield .................. B60R 1/12 |
| | | 340/438 |
| 8,719,726 B2 * | 5/2014 | Nakagawa .................... 715/802 |

(Continued)

FOREIGN PATENT DOCUMENTS

| DE | 10 2009 048 834 A1 | 4/2011 |
| JP | 2001-113981 A | 4/2001 |

(Continued)

*Primary Examiner* — Paul C McCord
(74) *Attorney, Agent, or Firm* — Global IP Counselors, LLP

(57) ABSTRACT

A vehicle information display device basically includes an audio unit, a steering switch and a meter unit. The audio unit is installed in a vehicle, and has an operation input unit. The steering switch operates the audio unit. The steering switch is provided to a steering wheel of the vehicle. The meter unit has a meter display for displaying operation specifics information that represents operation specifics conveyed as an instruction to the audio unit by operation of the operation input unit or the steering switch.

2 Claims, 5 Drawing Sheets

(56) References Cited

U.S. PATENT DOCUMENTS

| | | | |
|---|---|---|---|
| 8,726,188 B2* | 5/2014 | Tan | G05B 23/0272 |
| | | | 701/29.1 |
| 8,818,622 B2* | 8/2014 | Bergholz et al. | 701/36 |
| 2001/0020202 A1* | 9/2001 | Obradovich | B60K 35/00 |
| | | | 701/1 |
| 2003/0085805 A1* | 5/2003 | Paulo | G08G 1/0104 |
| | | | 340/425.5 |
| 2005/0172230 A1* | 8/2005 | Burk et al. | 715/716 |
| 2006/0276940 A1* | 12/2006 | Berg | B60K 35/00 |
| | | | 701/1 |
| 2009/0135089 A1* | 5/2009 | Konishi | B60K 35/00 |
| | | | 345/1.3 |
| 2009/0177392 A1 | 7/2009 | Komaba | |
| 2009/0228837 A1* | 9/2009 | Suzuki et al. | 715/841 |
| 2010/0268400 A1 | 10/2010 | Amano et al. | |
| 2011/0131515 A1 | 6/2011 | Ono et al. | |
| 2012/0089910 A1* | 4/2012 | Cassidy | 715/716 |
| 2012/0272185 A1* | 10/2012 | Dodson et al. | 715/810 |
| 2012/0311443 A1* | 12/2012 | Chaudhri et al. | 715/716 |

FOREIGN PATENT DOCUMENTS

| | | |
|---|---|---|
| JP | 2006-205866 A | 8/2006 |
| JP | 2009-161049 A | 7/2009 |
| JP | 2010-217824 A | 9/2010 |

\* cited by examiner

INFORMATION DISPLAY DEVICE FOR VEHICLE

CROSS-REFERENCE TO RELATED APPLICATIONS

This application is a U.S. National stage application of International Application No. PCT/JP2012/067086, filed Jul. 4, 2012, which claims priority under to Japanese Patent Application No. 2011-151595 filed in Japan on Jul. 8, 2011, the contents of which are hereby incorporated herein by reference.

BACKGROUND

Field of the Invention

The present invention relates to an information display device for a vehicle, the information display device displaying information to the driver of the vehicle.

Background Information

There are known techniques for operating an automotive audio device using a steering switch provided to the steering wheel of an automobile (see, e.g., Japanese Laid-Open Patent Publication No. 2006-205866).

SUMMARY

However, according to the above techniques, a problem is presented in that the driver cannot verify the detail of the operation of the steering switch, and it is difficult to determine whether or not it has been possible to properly convey as an instruction the operation intended by the driver to the automotive audio device.

The present invention addresses the problem of providing an information display device for a vehicle in which the driver can readily verify the operation specifics.

In the present invention, the above problem is solved by having a display part of a meter unit display information representing the operation specifics conveyed as an instruction to the audio unit by operating an operation input unit or a switch.

According to the present invention, the driver can visually identify the operation specifics information through the display part of the meter unit, and therefore readily verify the operation specifics.

BRIEF DESCRIPTION OF THE DRAWINGS

Referring now to the attached drawings which form a part of this original disclosure.

DETAILED DESCRIPTION OF THE EMBODIMENTS

An embodiment of the present invention will now be described with reference to the accompanying drawings.

Figure 1:
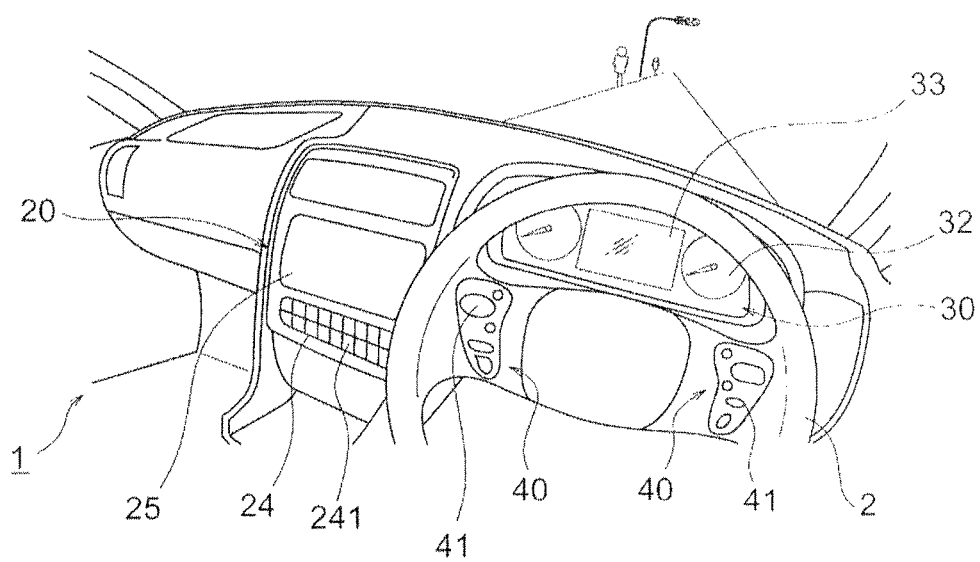
FIG. 1 is a perspective view showing an information display device for a vehicle according to an embodiment of the present invention.
Figure 2:
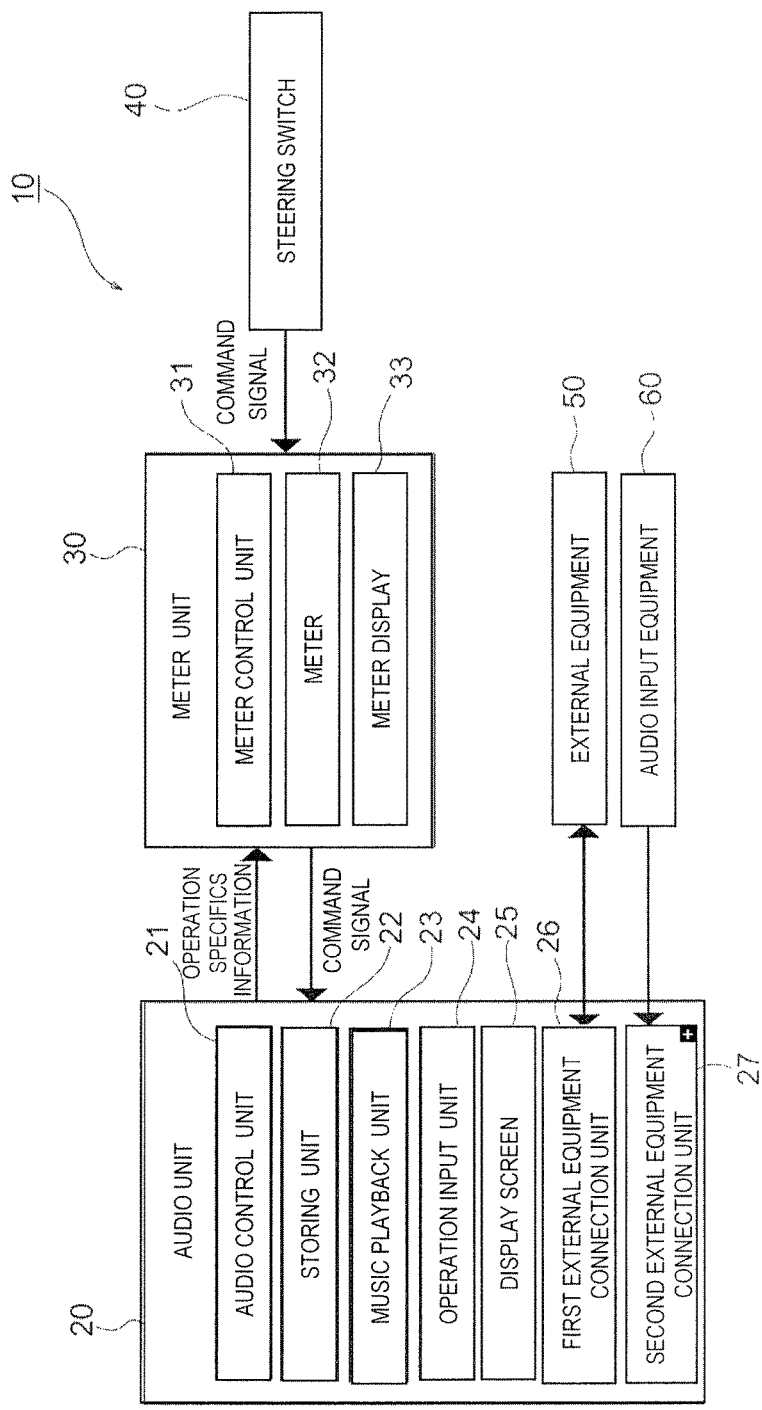
FIG. 2 is a block diagram showing the configuration of the information display device for a vehicle according to the embodiment of the present invention.

FIG. 1 is a perspective view showing an information display device for a vehicle according to the present embodiment, and FIG. 2 is a block diagram showing the configuration of the information display device for a vehicle according to the present embodiment.

As shown in FIGS. 1 and 2, the information display device 10 for a vehicle comprises an audio unit 20, a meter unit 30, and a steering switch 40, and the information display device 10 for a vehicle is disposed around a driving seat for seating the driver in the vehicle compartment of an automobile 1.

The audio unit 20 comprises an audio control unit 21, a storing unit 22, a music playback unit 23, an operation input unit 24, a display screen 25, and external equipment connection parts 26, 27.

The audio control unit 21 controls each of the elements 22 to 27 in the audio unit 20.

The storing unit 22 comprises, e.g., a hard disk, and stores copies of numerous music files stored on a CD or the like. Examples of formats of the music files stored in the storing unit 22 include MPEG Audio Layer 3 (MP3), Windows™ Media Audio (WMA), and Advanced Audio Coding (AAC).

The music files include, in addition to the music data of songs, tag information representing, e.g., the genre of the song, the artist who created the song, the album containing the song, and the title of the song.

The storing unit 22 has formed therein a folder hierarchy structure organized in the sequence of, e.g., genre, artist, and album based on the tag information, and the music files are stored in the folders at the lowest rank (i.e., albums).

Specifically, artists belonging to the same genre are stored in the same genre (folder), albums belonging to the same artist are stored in the same artist (folder), and music files corresponding to each album are stored in the respective album folder.

The music playback unit 23 comprises an MP3 player, a WMA player, an AAC player, and the like, and is capable of selecting and playing back an arbitrary music file stored in the storing unit 22. Music played back by the music playback unit 23 has an audio signal converted into sound waves by an audio output unit (not shown) and is outputted through a speaker or the like.

The music playback unit 23 in the present embodiment is also capable of sequentially playing back the music files stored in the folder for the genre, artist, or album conveyed as an instruction by the driver operating the operation input unit 24 or the steering switch 40.

The audio unit 20 may also be provided with other audio functions such as radio, CD player, MD player, or television, or be additionally equipped with a navigation function or the like.

The operation input unit 24 comprises, e.g., a plurality of operation keys, operation buttons 241, or the like. The driver is able to perform an operation input into the audio unit 20 through the operation input unit 24. If the display screen 25 comprises a touch panel, the operation input unit 24 may comprise keys and buttons displayed on the touch panel.

The display screen 25 comprises, e.g., a liquid crystal display or an organic EL display. The display screen 25 is capable of displaying, e.g., information being executed (processed) by the audio unit 20. In the example shown in FIG. 4A, the display screen 25 is displaying the folder information ("F01") and the track information ("T01") of the music file currently being played by the music playback unit 23. If the audio unit 20 has a navigation function, the display screen 25 may display, in addition to information relating to audio, map information, congestion information, route guide information and the like.

A first external equipment connection unit 26 has, e.g., a wireless communication unit corresponding to Bluetooth™ and a wired connection part such as a USB connector. Connecting an external equipment 50 such as a mobile telephone or a portable music player to the first external equipment connection unit 26 makes it possible to operate the external equipment 50 through the audio unit 20, or output music files stored in the external equipment 50 through the audio unit 20.

Similarly, a second external equipment connection unit 27 also has, e.g., a wireless communication unit corresponding to Bluetooth™ and a wired connection part such as a USB connector. Connecting an audio input device 60 such as a microphone to the second external equipment connection unit 27 makes it possible to operate the audio unit 20 by voice recognition through the audio input device 60.

The meter unit 30 is provided with a meter control unit 31, a variety of types of meters 32, and a meter display 33. The meter control unit 31 is capable of receiving detection signals from a wheel rotation sensor and a crank position sensor (not shown), and commands the meters 32 such as a speedometer and a tachometer to display the vehicle speed and the engine rotation speed. The meters 32 may also include, e.g., a fuel meter for indicating the amount of remaining fuel.

The meter display 33 comprises, e.g., a liquid crystal display or an organic EL display, and is capable of displaying information such as various types of information regarding the automobile 1 transmitted from the meter control unit 31 and information from the navigation function. Examples of the various types of information regarding the automobile 1 include alert information, maintenance information, and travel information regarding the automobile 1.

Examples of alert information include alerts to warn the driver of an unclosed door, an unclosed trunk, the handbrake not being returned, or low fuel. Examples of maintenance information include information indicating time to replace a tire, the oil filter, or the engine oil. Examples of travel information include the odometer, tripmeter, average fuel cost, average vehicle speed, travel time, travel distance, or outside air temperature.

The meter display 33 of the present embodiment is also capable of displaying, in addition to the various types of information regarding the automobile 1 and information from the navigation function, audio information transmitted from the audio unit 20 (described further below).

There are no particular restrictions on the specifics displayed on the meter display 33. For example, instead of using dedicated meters 32 for the speedometer and the tachometer, all of the meters, display lights, alert lights, and the like may be displayed on a single meter display 33. Alternatively, a dedicated display for displaying only the audio information may be provided to the meter unit 30.

As shown in FIG. 1, the steering switch 40 comprises several operation keys 41 provided to a steering wheel 2 of the automobile 1, enabling the driver to operate the audio unit 20 while holding the steering wheel 2. An arrangement is also possible in which equipment other than the audio unit 20 (e.g., the external equipment 50) can be operated using the steering switch 40.

In the present embodiment, the driver is able to operate the steering switch 40 to e.g., switch the audio source, play/stop the music, or adjust the volume, and in CD mode, select the desired song, genre, artist, or album. In the present embodiment, the CD mode refers to a mode in which the music playback unit 23 plays the CD content stored in the storing unit 22. Operation of the audio unit 20 is not specifically restricted to that performed through the operation input unit 27 or the steering switch 40; the driver may operate the audio unit 20 by operating operation buttons installed in the vehicle compartment of the automobile 1.

The steering switch 40 described above is connected to the meter unit 30 via, e.g., CAN communication, and the meter unit 30 is able to receive, from the steering switch 40, command signals generated by the driver operating the steering switch 40.

The meter unit 30 and the audio unit 20 are connected, via, e.g., CAN communication, so as to be capable of communicating with each other. The meter unit 30 is capable of transmitting, to the audio unit 20, the command signal received from the steering switch 40.

Meanwhile, the audio unit 20 is capable of transmitting, to the meter unit 30, audio information relating to audio via, e.g., CAN communication. The meter unit 30 is capable of displaying, on the meter display 33, the audio information received from the audio unit 20.

The audio information in the present embodiment includes at least operation specifics information. The operation specifics information refers to the concrete specifics of the instruction conveyed to the audio unit 20 by the driver operating the operation input unit 24 or the steering switch 40 (in other words, the specifics that are directly changed in the audio unit 20 by operation of the operation input unit 24 or the steering switch 40). The operation detail information may be, e.g., genre information, artist information, or album information of the music file, and excludes song title information, file name information, or track information of the music file. This operation specifics information is different from the ultimate result of an operation performed by the audio unit based on the operation performed on the operation input unit 24 or the steering switch 40.

The audio information may include information other than the operation specifics information, and may include, e.g., the specifics currently being processed by the audio unit 20 (e.g., information regarding the audio source currently selected).

Next, control of the information display device 10 for a vehicle according to the present embodiment will now be described, with reference to FIGS. 3-5, using an example in which the driver operates the steering switch 40 to change the album.

Figure 3:
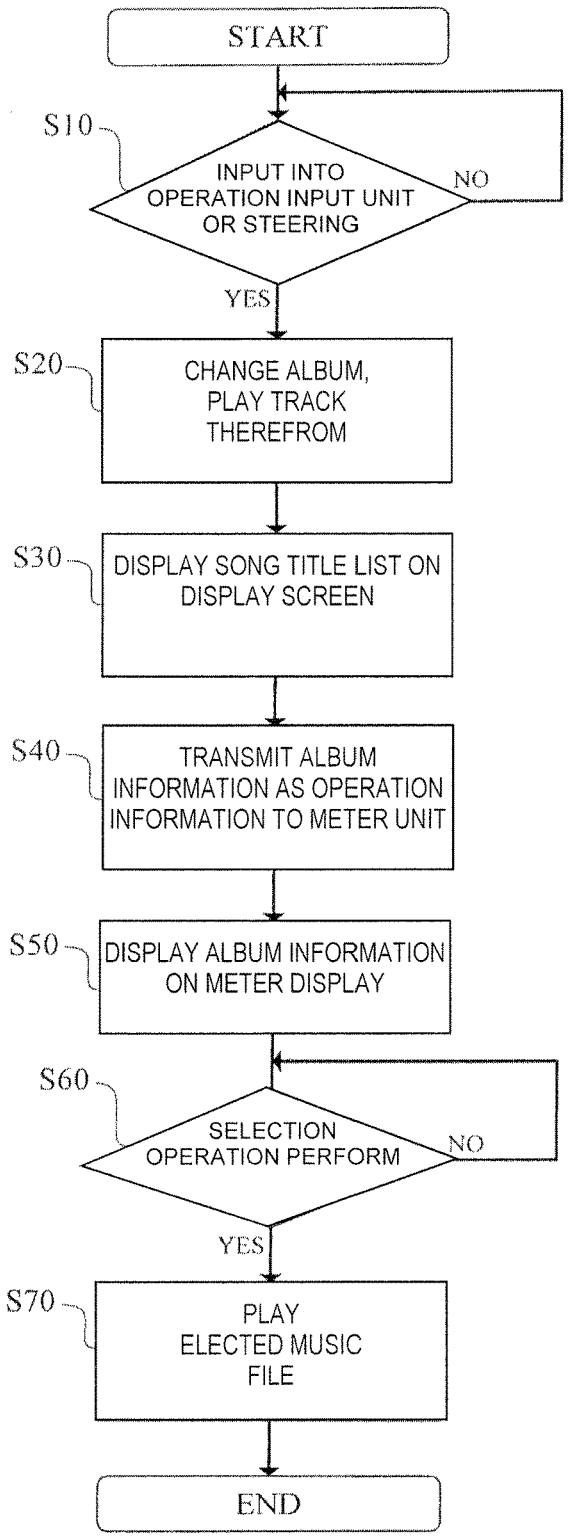
FIG. 3 is a flow chart showing the control of the information display device for a vehicle according to the embodiment of the present invention.
Figure 4A:
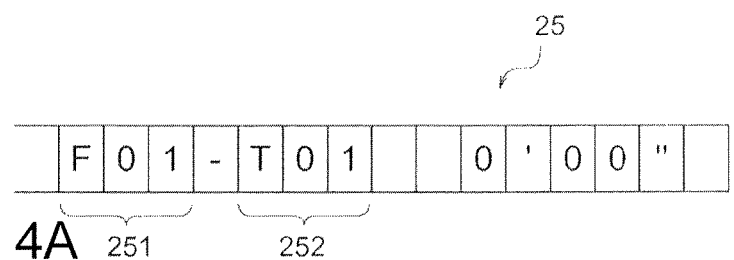
FIG. 4A shows the display screen and the meter display screen before the control shown in FIG. 3 is executed.
Figure 4B:
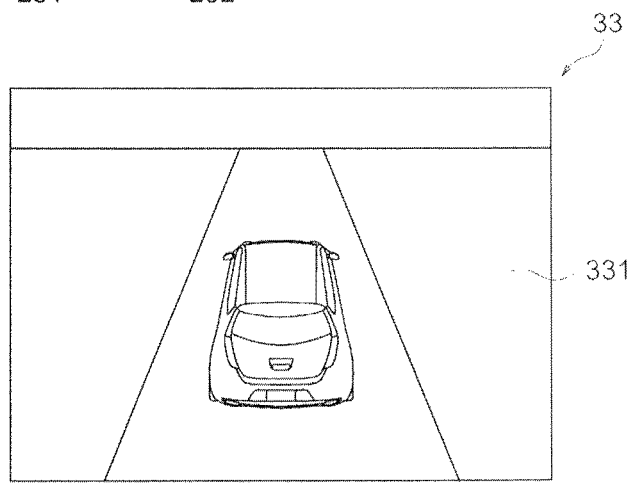
FIG. 4B shows the display screen and the meter display screen before the control shown in FIG. 3 is executed.
Figure 4C:
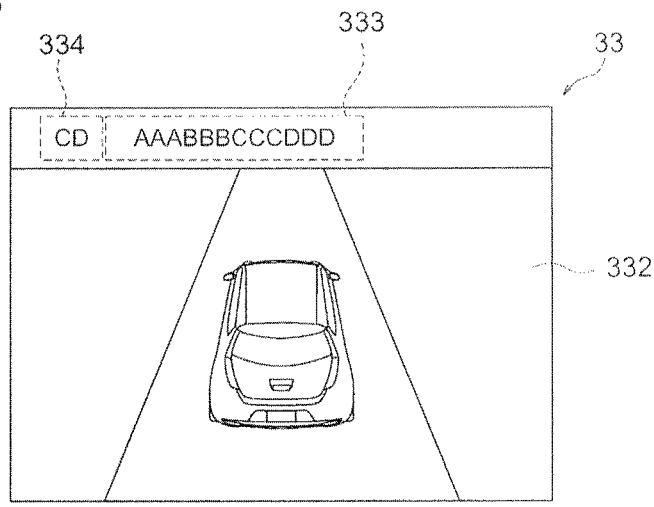
FIG. 4C shows the meter display screen upon the control shown in FIG. 3 being executed.
Figure 5A:
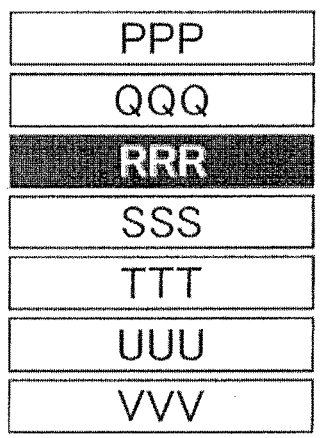
FIG. 5A shows an example of displaying of a song title list immediately after the album is changed.
Figure 5B:
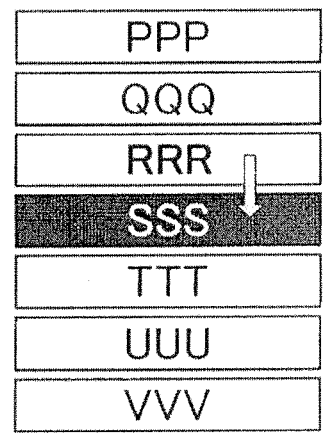
FIG. 5B shows an example of displaying of the song title list during song selection.

FIG. 3 is a flow chart showing the control of the information display device for a vehicle according to the present embodiment; FIGS. 4A, 4B, and 4C show the displays before and after the control shown in FIG. 3 is executed; FIG. 5A shows an example of displaying of a song title list immediately after the album is changed; and FIG. 5B shows an example of displaying of the song title list during song selection.

First, as shown in step S10 in FIG. 3, the audio control unit 21 of the audio unit 20 determines whether or not the driver has performed an operation to change the album using the steering switch 40.

An example of a specific method for operating the steering switch 40 is as follows. Specifically, the driver first selects and determines, using an operation key 41, "album" from classifications (e.g., "genre", "artist", and "album") displayed on the display screen 25 of the audio unit 20, then selects, using the operation key 41, the desired album from the albums displayed as a list, and thereby changes the album.

Prior to the driver operating the steering switch 40 (NO in step S10 in FIG. 3), folder information 251 (F01) and track information 252 (T01) regarding the song currently being played are displayed on the display screen 25 of the audio unit 20, as shown in FIG. 4A. Meanwhile, an image 331 unrelated to the audio unit 20 (e.g., various types of information regarding the automobile 1 and information from the navigation function) is displayed on the meter display 33 of the meter unit 30 as shown in FIG. 4B).

When the driver performs an operation to change the album using the steering switch 40 (YES in step S10 in FIG. 3), a command signal is transmitted from the steering switch 40 to the audio unit 20 through the meter unit 30 in step S20 in FIG. 3.

Then, the audio control unit 21 of the audio unit 20 causes, based on the command signal from the steering switch 40, the music playback unit 23 to start playing the music file (track) stored in the folder corresponding to the album to which the change has been made. For example, if album B is selected through operation of the steering switch 40 while a music file in album A is being played, the music playback unit 23 plays, immediately after the selection, the music file at the point at which playback of album B was last discontinued.

The audio control unit 21 causes the display screen 25 to display the folder information and the track information regarding the song to which the change has been made, based on the command signal from the steering switch 40, in step S30 in FIG. 3.

At this time, in addition to the folder information and the track information, e.g., a list of song title information for all music files stored in the album selected through operation of the steering switch 40 is displayed vertically on the display screen 25 as shown in FIG. 5A. In the example shown in FIG. 5B, a list comprising seven song titles, i.e., "PPP", "QQQ", "RRR", "SSS", "TTT", "UUU", and "VVV" (each representing an example of a song title), is displayed, and "RRR", the song title of the music file currently being played, is highlighted. A list of filename information or of track information of the music files stored in the album may be displayed, instead of the song title information, on the display screen 25.

The audio control unit 21 transmits, to the meter unit 30, the album information for the album to which the change has been made as operation specifics information in step S40 in FIG. 3 while causing the music playback unit 23 to play the music files in the album to which the change has been made as described above.

Then, the meter control unit 31 of the meter unit 30 causes, in step S50 in FIG. 3, the meter display 33 to display the album information transmitted from the audio unit 20. At this time, as shown in FIG. 4C, the album information 333 for the album to which the change has been made (operation specifics information) is displayed on the upper part of the screen of the meter display 33 while maintaining an image 332 required by the driver at the center of the screen of the meter display 33. In the example shown in FIG. 4C, "AAABBBCCCDDD" (album title) is displayed as the album information 333 for the album to which the change has been made.

Information 334 relating to, e.g., the specifics currently being processed by the audio unit 20 may be displayed in addition to the album information 333, taking the visibility or the legibility of the meter display 33 for the driver into account. In the example shown in FIG. 4C, "CD" (audio source name) is displayed as the audio information 334 of the audio unit 20.

Then, in step S60 in FIG. 3, the driver can operate the steering switch 40 upwards and downwards, and thereby move the highlighted display in the list displayed on the display screen 25 upwards and downwards and select the music file to be played.

For example, when, in a state in which the song having a title "RRR" is being played (see FIG. 5A), the steering switch 40 is operated downward, whereby the song title "SSS" below the song title "RRR" is selected as shown in FIG. 5B, the music file corresponding to the song title "SSS" is immediately played by the music playback unit 23 (step S70 in FIG. 3). As shown in FIG. 5B, the selected song title "SSS" becomes highlighted instead of the song title "RRR" on the display screen 25 with the operation of the steering switch 40.

Similarly, although not shown, when the song title "QQQ" above the song title "RRR" is selected by the steering switch 40 being operated upward, the music file corresponding to the song title "QQQ" is immediately played. If the driver continues to operate the steering switch 40 in the same direction, the opening portions of the music files stored in the album are sequentially played, and the driver is able to sequentially listen to the opening portions and thereby choose the desired song.

In the present embodiment, the upward operation of the steering switch 40 is associated with the action of selecting the music file prior to the music file currently being played, and the downward operation of the steering switch 40 is associated with the action of selecting the music file after the music file currently being played; however, this is not provided by way of limitation.

In the present embodiment, even when, in steps S60 and S70, the driver operates the steering switch 40 to select the desired music file and playback of the music file has commenced, the meter display 33 continues to display the operation specifics information prior to the music file selection (i.e., in the present example, the abovementioned "album information 333 for the album to which the change has been made") (i.e., maintains the state in FIG. 4C). The song title information, filename information, or the track information of the selected music file is not displayed on the meter display 33. As a result, the driver can verify the specifics of the operation that has just taken place even after the song selection has taken place.

In the above example, a description was given for an instance in which the driver operates the steering switch 40 to change the album. However, the driver may also operate the operation input unit 24 of the audio unit 20 to change the album.

The control flow in such an instance is similar to that in FIG. 3 described above, other than the command signal being transmitted from the operation input unit 24 to the audio control unit 21 in the audio unit 20 in step S20 in FIG. 3.

In addition, in the above embodiment, a description was given for an instance in which the driver changes the album; however, the driver may also change the artist or the genre.

If the driver has changed the artist, the audio unit 20 plays, in step S20 in FIG. 3, the music file stored in the folder corresponding to the artist to which the change has been made, and transmits, as the operation specifics information, the artist information for the artist to which the change has been made to the meter unit 30 in step S40 in FIG. 3. Next, in step S50 in FIG. 3, the meter display 33 displays the artist information for the artist to which the change has been made (e.g., "Mozart") on the upper part of the screen.

If the driver has changed the genre information, the audio unit 20 plays, in step S20 in FIG. 3, the audio file stored in the folder corresponding to the genre to which the change has been made, and transmits, in step S40 in FIG. 3, the genre information for the genre to which the change has been made to the meter unit 30 as the operation specifics information. Next, in step S50 in FIG. 3, the meter display 33 displays the genre information for the genre to which the change has been made at the upper part of the screen (e.g., "Pop", "Classic", or "Jazz").

In the embodiment described above, the three music file classifications of genre, artist, and album were given as examples. However, this is not provided by way of limitation. The storing unit 22 of the audio unit 20 may store lower-order folders and song files in folders categorized by an element other than genre, artist, and album.

In this instance, the driver can operate the operation input unit 24 or the steering switch 40 to select a folder categorized by a category other than genre, artist, or album. Then, the music playback unit 23 executes the music file stored in the folder, and the meter unit 30 displays the corresponding folder information as the operation specifics information on the meter display 33.

As described above, in the present embodiment, the information representing the operation specifics conveyed as an instruction to the audio unit 20 by the driver operating the operation input unit 24 or the steering switch 40 is displayed on the meter display 33 of the meter unit 30. Therefore, the driver can readily verity the specifics of the command through the meter display 33.

In particular, the operation specifics information is different from the ultimate result of the operation performed by the audio unit 20 based on the operation performed on the operation input unit 24 or the steering switch 40. Therefore, the driver can readily verify whether or not it has been possible to convey as an instruction the intended operation to the audio unit 20, rather than the result of the operation performed by him/herself.

In addition, the operation specifics information in the present embodiment includes, e.g., genre information, artist information, album information, or folder information. It is difficult for the driver to establish whether or not the intended command has been followed merely by the corresponding music file being played and the song title being displayed when the genre, artist, album, or folder is changed by an operation performed by the driver. In contrast, in the present embodiment, information representing the genre, artist, album, or folder to which the change has been made is displayed on the meter display 33, and the driver can therefore readily verify whether or not the intended command has been followed.

In addition, in the present embodiment, the operation specifics information is displayed on a meter display for displaying vehicle information, obviating the need to provide a dedicated display for displaying the operation specifics information and making it possible to utilize space in an effective manner.

The automobile 1 in the present embodiment corresponds to an example of a vehicle in the present invention, the meter display 33 in the present embodiment corresponds to an example of a display unit in the present invention, the storing unit 22 in the present embodiment corresponds to an example of a memory means in the present invention, and the music playback unit 23 in the present embodiment corresponds to an example of a playback means in the present invention.

The embodiment described above is set forth in order to facilitate understanding of the present invention, and not to limit the present invention. Therefore, each of the elements disclosed in the above embodiment include all design changes and equivalents belonging to the technical scope of the present invention.

KEY TO SYMBOLS

1 Automobile
2 Steering wheel
10 Vehicle information display device
20 Audio unit
21 Audio controller
22 Storing unit
23 Music playback unit
24 Operation input unit
25 Display screen
26 First external equipment connection unit
27 Second external equipment connection unit
30 Meter unit
31 Meter control unit
32 Meter
33 Meter display
40 Steering switch

The invention claimed is:

1. A vehicle information display device comprising:
an audio unit installed in a vehicle that is equipped with the vehicle information display device;
a switch operatively coupled to the audio unit for operating the audio unit; and
a meter unit having a first display screen that is a meter display disposed in front of a driver seat,
the audio unit having an operation input unit, a second display screen disposed between the driver seat and a front passenger seat of the vehicle, a storing unit that stores music files, and a music playback unit that plays the music files,
the first display screen of the meter unit and the second display screen of the audio unit being arranged in a location that is visible to a driver seated in the driver seat of the vehicle,
the first display screen displaying operation specifics information representing operation specifics conveyed as an instruction to the audio unit having the second display screen by operation of at least one of the operation input unit and the switch,
the operation specifics information including at least one of genre information, artist information, album information and folder information,
the music playback unit being configured to play a selected music file of the music files that corresponds to the operation specifics information,
at least one of the operation input unit and the switch being configured to select the music file after the first display screen displays the operation specifics information, the second display screen being configured to display at least one of song title information, filename information and track information regarding the music file selected by operation of the at least one of the operation input unit and the switch after the first display screen displays the operation specifics information, and the first display screen continuing to display the operation specifics information corresponding to the time prior to the selected music file being selected, even after the selected music file is selected by operation of the at least one of the operation input unit and the switch.

2. The vehicle information display device according to claim 1, wherein the operation specifics information is different from an ultimate result of an operation performed by the audio unit based on operation of the at least one of the operation input unit and the switch.

* * * * *